May 8, 1951  O. B. REID  2,551,851
ELECTRONIC SEAMING MACHINE
Filed Oct. 20, 1948  4 Sheets-Sheet 1

Inventor
Orland B. Reid
By William P. Stewart
Attorney

Witness:
William Martin

May 8, 1951  O. B. REID  2,551,851
ELECTRONIC SEAMING MACHINE
Filed Oct. 20, 1948  4 Sheets-Sheet 4
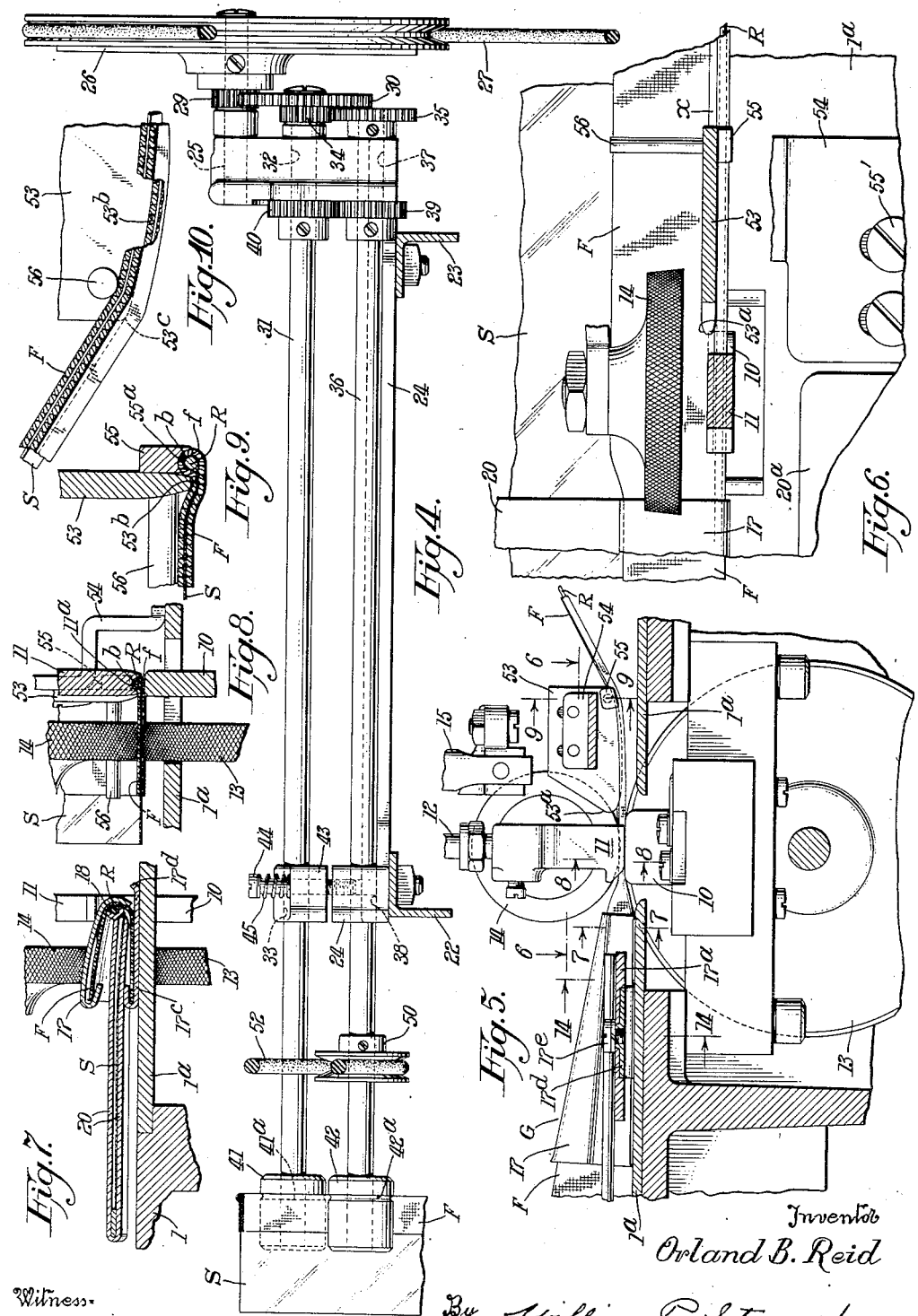
Inventor
Orland B. Reid
By William P. Stewart
Attorney
Witness:
William Martin Patented May 8, 1951

2,551,851

UNITED STATES PATENT OFFICE 2,551,851

ELECTRONIC SEAMING MACHINE

Orland B. Reid, Kenilworth, N. J., assignor to The Singer Manufacturing Company, Elizabeth, N. J., a corporation of New Jersey Application October 20, 1948, Serial No. 55,513

8 Claims. (Cl. 154—42)

1

This invention relates to electric bonding machines of the type known in the trade as the "Singer" Electronic Seamer which is adapted to bond together sheets of thermoplastic material and/or sheets coated or impregnated with such material.

The invention has as its primary object to adapt the machine for making reed and protector strips for hat sweats and the like.

Another object of the invention is to embody in an electric bonding machine auxiliary presser means for holding the bonded materials together after they have passed the bonding electrodes and during the time that the material is still in a tacky condition.

Still another object of the invention is to combine in an electric bonding machine, having a main feed mechanism, an auxiliary feed mechanism preferably in the form of a puller-feed for carrying the work away after it has passed the bonding electrodes and the main work-feeding mechanism and to cause the auxiliary feed mechanism to draw the work around and in contact with a heel of the auxiliary presser element as the work leaves the auxiliary presser means to give to the work a final compression to insure smoothness and uniformity in the finished product.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings:

Fig. 4 is an enlarged vertical section taken on the lines 4—4 of Figs. 2 and 3.

Fig. 5 is an enlarged vertical section taken substantially on the line 5—5 of Fig. 1.

Fig. 6 is an enlarged horizontal section taken substantially on the line 6—6 of Fig. 5.

Fig. 7 is an enlarged vertical section taken substantially on the line 7—7 of Fig. 5.

2

Fig. 8 is an enlarged vertical section taken substantially on the line 8—8 of Fig. 5.

Fig. 9 is an enlarged vertical section taken substantially on the line 9—9 of Fig. 5.

Fig. 10 is an enlarged detail face view of a portion of an auxiliary presser member and a guide-pin carried thereby, hereinafter described, as seen from the left end of the machine.

Figure 3:
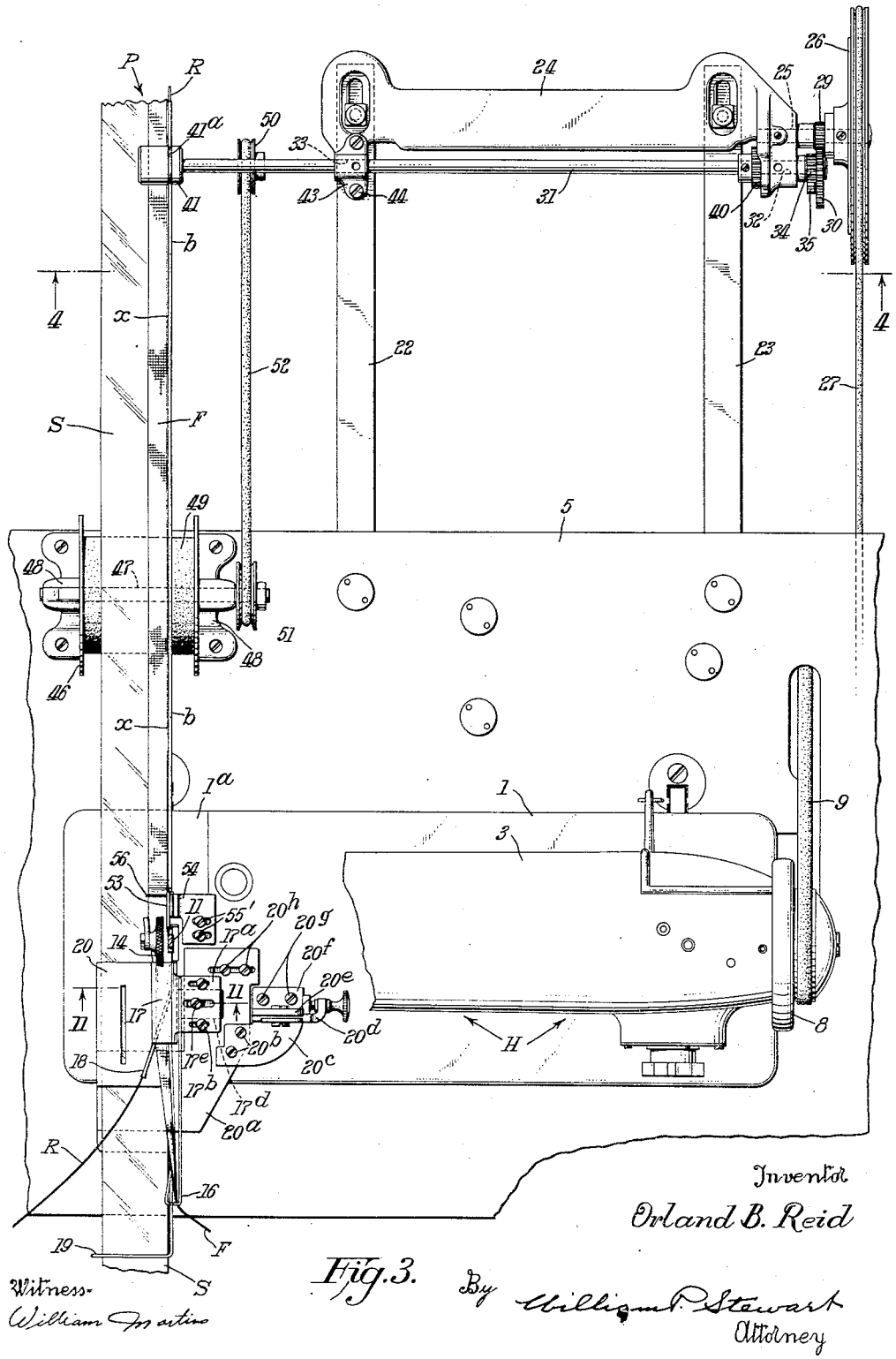
Fig. 3 is a plan view of the parts shown in Figs. 1 and 2 with a portion of the machine and a portion of the supporting table broken away.

Fig. 11 is a fragmentary sectional view taken substantially on the line 11—11 of Fig. 3.

Fig. 12 is a fragmentary vertical sectional view of the bottom portion of the upper electrode.

Fig. 13 is an enlarged cross sectional view of a portion of the completed reed and protector strip.

Fig. 14 is a perspective view of a portion of a reed and protector strip for hat sweats as made by the present machine.

Figure 1:
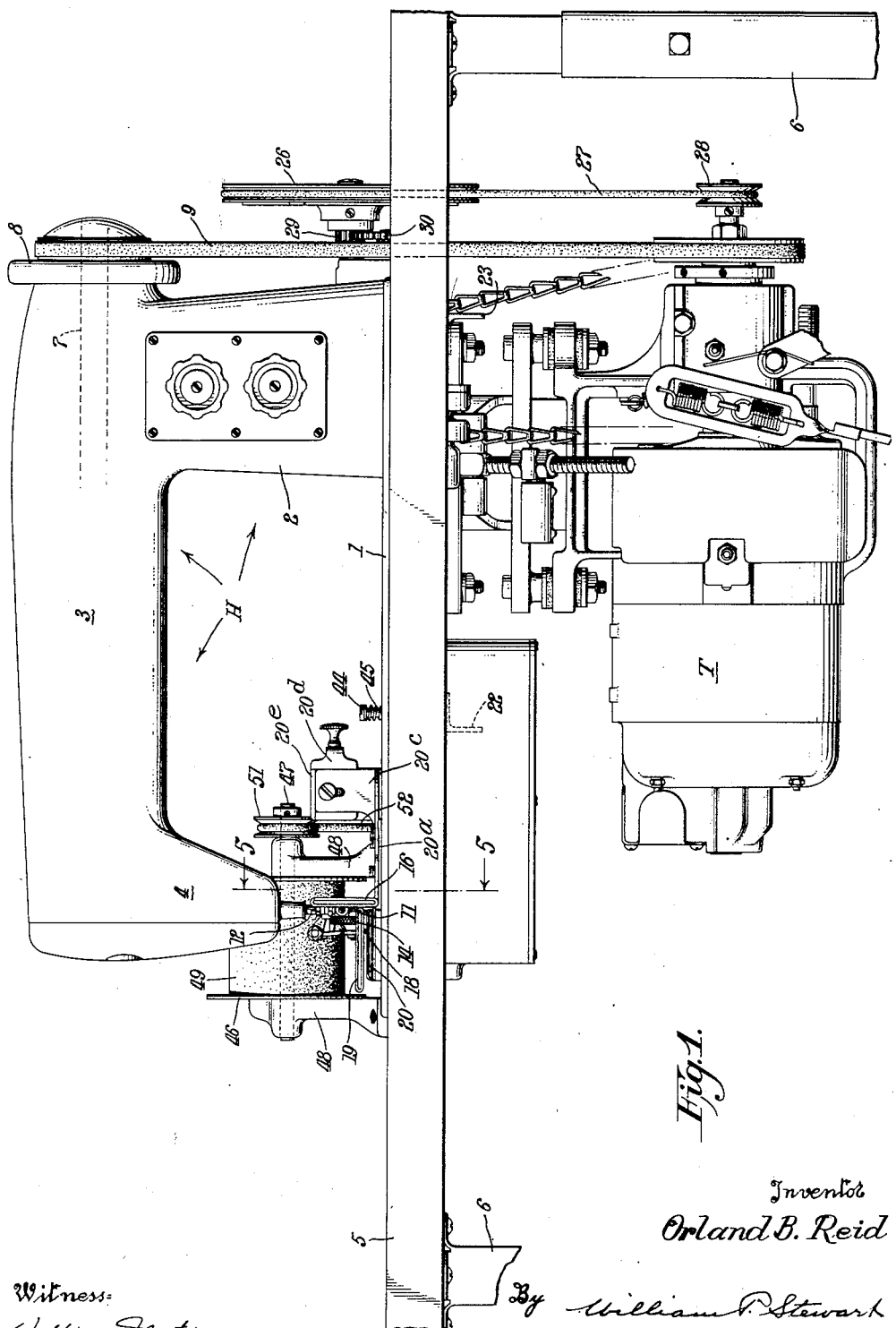
Fig. 1 is a front elevation of an electronic seaming machine embodying the present invention, together with its driving means and a portion of its supporting table.
Figure 2:
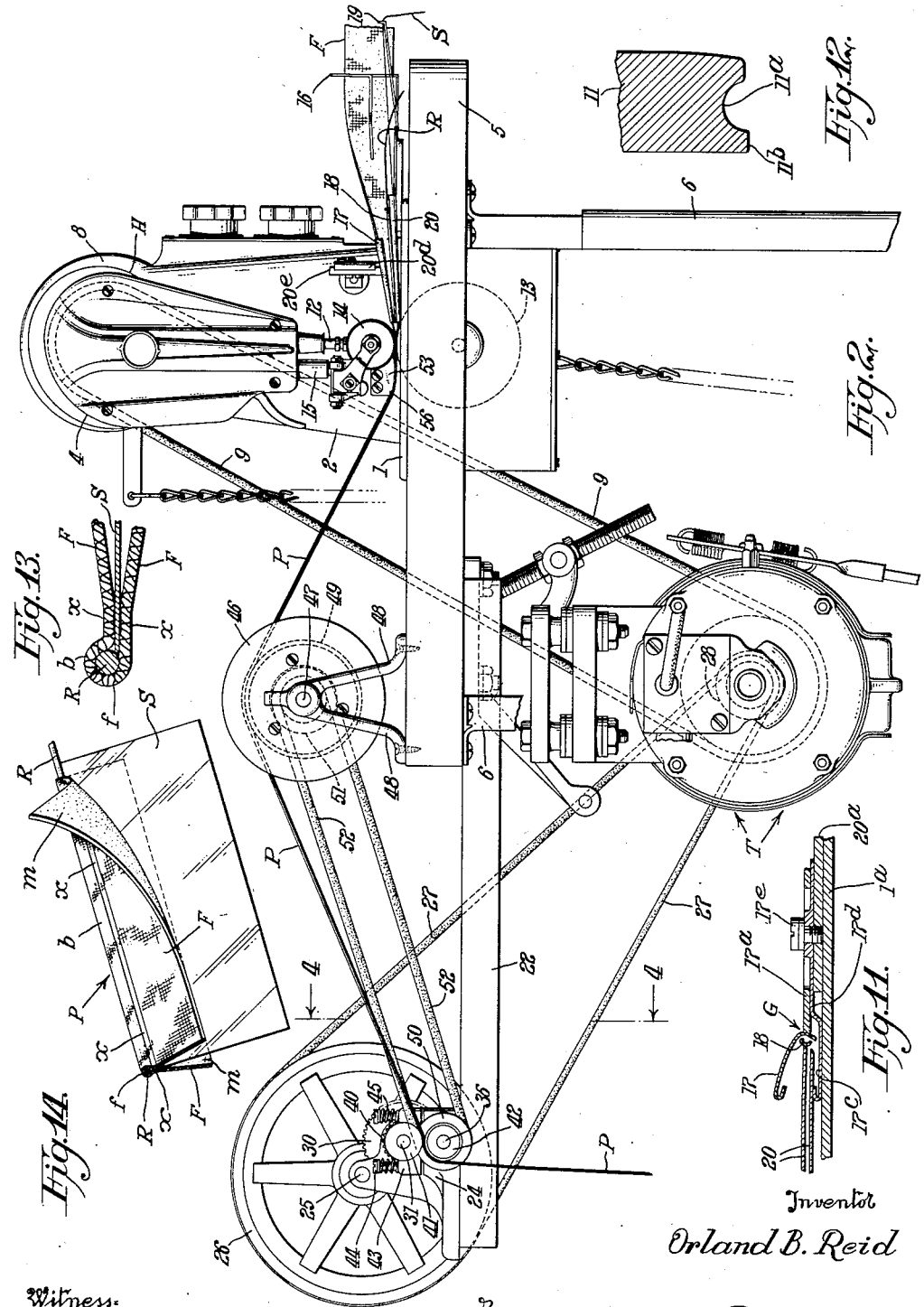
Fig. 2 is a left end elevation of the machine and equipment illustrated in Fig. 1.

Referring more specifically to the drawings, the invention is disclosed as embodied in an electronic seaming machine including a bonding head, designated generally as H, comprising a work-supporting plate 1, an upright standard 2, an overhanging bracket-arm 3 and a bracket-arm head 4. The electronic seaming machine is preferably mounted on a suitable support including a table top 5 carried by the upper ends of supporting legs 6. Journaled lengthwise within the arm 3 and the upper end of the standard 2 is a rotary main shaft 7, shown only in dotted lines in Fig. 1, which carries at its rear end a combined belt and hand wheel 8 adapted to be rotated by a belt 9 from a conventional electric power transmitter T secured to the under side of the table top.

The bonding head is provided with a lower, stationary electrode 10 and an upper reciprocating electrode 11 carried by a reciprocating bar 12 mounted in the bracket-arm head. The machine is also provided with a step-by-step rotary feed-wheel 13 for advancing the work through the machine and a cooperating roller presser 14 carried by a spring-depressed presser-bar 15 also mounted in the bracket-arm head 4.

The general construction of the head H and the means for supplying radio frequency electric current to the field formed between the upper and lower electrodes constitutes no part of this invention and therefore detailed illustration and description thereof is deemed unnecessary. A substantially identical machine is shown and described in United States patent of H. Hacklander, No. 2,432,412, December 9, 1947 to which reference may be had for a more complete disclosure of the construction and operation of the machine.

As hereinbefore indicated, this invention relates primarily to the adaptation of the above described electronic seaming machine to the making of reed and protector strips for hat sweats. A portion of such a strip, designated generally as P, is illustrated in Fig. 14 in which R represents the reed which is enclosed within a fold $f$ of a fabric strip F which may either be impregnated with, or be coated with a suitable bondable thermoplastic material indicated at $m$. Between the opposite walls of the folded fabric strip F there is inserted a strip S of bondable thermoplastic material, the inner edge of which preferably abuts the side of the reed R. After the parts have been bonded together, as hereinafter described, the completed reed and protector strip is adapted to be embodied in a hat to prevent perspiration and oil from the head of the wearer passing through the hat sweat to the outside of the hat. When embodied in a hat, one flap of the folded fabric strip F is stitched to the body of the hat and the other flap has the leather sweat band sewed thereto. Thus the strip P forms a waterproof and oilproof partition between the sweat band and the outside of the hat.

The means for guiding the various elements of the reed and protector strip to the bonding electrodes comprise a vertically disposed guide 16 and a horizontally disposed folding guide G for the strip F, a horizontally disposed tubular guide 18 adapted to direct the reed R into the fold $f$ of the strip F slightly in advance of the bonding station, and a horizontally disposed guiding loop 19 and an aligned horizontally disposed flattened tubular guide member 20 for the thermoplastic strip S. The tubular guide member 20 is carried by a plate 20ª secured by screws 20ᵇ to an angle plate 20ᶜ which, in turn, is secured to a carriage 20ᵈ adjustably mounted on the upright wall 20ᵉ of an L-shaped supporting bracket 20ᶠ, the base of which is secured to the work-supporting plate 1 by screws 20ᵍ. Screws 20ʰ passing through a slot in the plate 20ª and threaded into the work-supporting plate 1 help to guide the plate 20ª in its movements with the carriage 20ᵈ. For the purpose of adjustment, the folding guide G is preferably made in two parts, viz. an upper folding scroll 17 which is carried by a slotted shank 17ª adjustably mounted on the plate 20ª by screws 17ᵇ and a lower scroll member 17ᶜ carried by a shank 17ᵈ slidingly mounted in a guideway formed in the under side of the shank 17ª and held in adjusted positions therein by a clamp screw 17ᵉ. Adjacent its delivery end the reed guide 18 has one side wall cut away, as shown most clearly in Fig. 7, to cause the reed R to be directed against the inner surface of the fold $f$ in the strip F.

The elements of the composite reed and protector strip are drawn through the guides 16, 18, 19, 20 and the folder G and passed between the electrodes 10 and 11 by the action of the feed wheel 13 and the cooperating roller presser 14. As shown most clearly in Fig. 8, the upper surface of the lower electrode 10 is substantially flat while the lower surface of the upper electrode 11 is formed with a channel 11ª to receive the rounded bead $b$ comprising the reed R and the surrounding portion $f$ of the fabric strip F. The electrode 11 (Fig. 12) also has a depending lip or flange 11ᵇ which bears upon the upper ply of the strip F adjacent the bead $b$ to insure the bonding together of the thermoplastic strip S and the fabric strip F close to the reed R.

To aid in the passage of the work through and beyond the electronic seaming machine and to improve the quality of the work, this invention has provided an improved puller-feed mechanism now to be described. Adjustably mounted on arms 22 and 23, secured to and projecting rearwardly from the table 5, is a bearing bracket 24 in which is secured a stub shaft 25. Rotatably journaled on this shaft is a relatively large pulley wheel 26 connected by a belt 27 with a relatively small driving pulley 28 secured upon the drive shaft of the power transmitter T. Secured to the hub of the pulley 26 is a pinion 29 which meshes with and drives a gear 30 rotatably journaled on one end of a shaft 31 mounted in bearings 32 and 33 supported by the bracket 24. Secured to and rotatable with the gear 30 is a pinion 34 which drives a gear 35 secured upon one end of a shaft 36 journaled in bearings 37 and 38 provided by the bracket 24. From the foregoing, it will be understood that through the belt and pulley drive and the speed-reduction gear train the shaft 36 is driven from the power transmitter shaft at a greatly reduced ratio. This ratio may be varied by substituting pulleys of different diameters for the pulleys 26 and 28 or by varying the ratios of certain ones of the gears in the speed-reduction gear train. The shaft 31 is driven from and in synchronism with the shaft 36 by gears 39 and 40 secured respectively to the shafts 36 and 31.

Fixed to the opposite ends of the shafts 31 and 36 are feed rollers 41, 42, respectively, which are adapted to engage and feed opposite faces of the completed reed and protector strip P. The rollers 41, 42 are provided with annular channels 41ª, 42ª, respectively, to receive the bead $b$ of the strip. The bearing 33 for the shaft 31 is formed in a block 43 slidingly mounted on screws 44 threaded into the bracket 24. Coil springs 45 surrounding the screws 44 and interposed between heads thereof and the block 43 normally urge the shaft 31, and the feed roller 41 carried thereby, downwardly to cause the reed and protector strip to be gripped between the rollers 41 and 42 so that the strip will be fed rearwardly upon rotation of the shafts 31 and 36. Preferably, the peripheral speed of the feed rollers 41, 42 will be such that they will tend to feed the work therebetween at a slightly faster rate than it is fed past the bonding station by the feed-wheel 13 thereby maintaining the strip taut at all times. Controlled slippage between the rollers and the strip prevents tearing of the strip. The speed of rotation of the feed rollers, however, may be varied if desired, as above pointed out.

In its passage from the bonding machine to the feed rollers 41, 42, the bonded reed and protector strip P passes upwardly and over a roller 46, mounted on a shaft 47 journaled in bearing brackets 48 supported upon the upper surface of the table 5. The roller 46 is preferably covered with a coating of relatively soft material 49 which frictionally engages the reed and protector strip and assists in drawing the same away from the bonding machine. The shaft 47 and the roller 46, carried thereby are rotated from the rotary feed-shaft 36 through the medium of pulleys 50 and 51 carried by the shafts 36 and 47, respectively, and a connecting belt 52.

As is well understood in the art of electronic bonding, when dielectric material, such, for example, as the above mentioned thermoplastic strip S and the coated or impregnated fabric strip F, are subjected to a high frequency electric field, as between the electrodes 10 and 11 the dielectric material is heated and becomes fused and when pressed together between the electrodes becomes completely bonded or welded together.

In attempting to make the above described reed and protector strips at a rapid rate considerable difficulty was experienced due to the fact that the bond necessarily had to be relatively narrow and closely adjacent the reed R without securing the reed against endwise movement in the bead b. It was finally discovered that by forming the upper electrode with the channel 11ᵃ, to receive the bead b, and the relatively narrow depending flange 11ᵇ and causing the flange to bear upon the upper flap of the strip F adjacent the bead the parts could be directed to the electrodes in their proper relationship and a relatively narrow bond, designated as x, would be formed beside the bead b, and along one marginal portion of the strip S, without preventing endwise movement of the reed R in the bead.

However, as the work passes through the machine at a relatively high speed the bonded portion leaves the electrodes while the thermoplastic material is in a somewhat tacky condition. Therefore, there was a tendency for the narrow bond x to separate in spots, with the result that the finished product was not uniform in construction and was somewhat objectionable in appearance. This difficulty was finally overcome by providing auxiliary presser means which maintains the parts of the completed reed and protector strip in their assembled and bonded positions until the thermoplastic material has set and firmly united the parts so that they are permanently held against separation or relative movement.

This auxiliary presser means comprises a foot 53 in the form of a vertically disposed metal plate which is adjustably mounted on a bracket 54 secured by screws 55' to the throat-plate 1ᵃ which, in turn, is supported by the work-supporting plate 1 of the machine. The foot 53 is located closely behind the upper electrode 11 and has a rounded toe portion 53ᵃ and a convex lower edge 53ᵇ which engages the upper flap of the strip F closely adjacent the bead b as shown most clearly in Fig. 9. Adjacent its rear edge the foot 53 carries a guide block 55 which is provided in its under side with a concave channel 55ᵃ which is adapted to receive and guide the bear b of the bonded reed and protector strip P. It will be noted that as the completed strip P leaves the foot 53 it is moved upwardly and rearwardly to pass over the roller 46. This inclination of the strip is important as it causes the strip to be pulled under and in pressure contact with a rounded heel portion 53ᶜ (Fig. 10) of the foot 53 thus giving the parts of the strip a final compression as they pass from the bonding machine proper. The rear edge portion of the foot 53 also carries a laterally and horizontally projecting work-engaging pin 56 which overlies the upper flap of the fabric strip F to prevent undue upward deflection thereof.

Having thus set forth the nature of the invention, what I claim herein is:

1. An electric bonding machine comprising a bonding head having a rotary shaft and opposed electrodes, a power transmitter connected to rotate said shaft, electronic means for supplying radio frequency electric current to said electrodes to establish an electric field therebetween, a main feeding means actuated from said shaft and including a feeding element and a cooperating main presser device for progressively presenting plies of bondable material between said electrodes and to said field for causing bonding together of said plies, an auxiliary presser device continuously acting on said bonded material on the seam line after it has passed said electrodes and said main presser device to prevent separation of said plies while said bond is in a tacky condition, and an auxiliary feeding means actuated from said power transmitter and cooperating with said main feeding means to advance the bonded material.

2. An electric bonding machine comprising opposed electrodes, electronic means for supplying radio frequency electric current to said electrodes to establish an electric field therebetween, work-guiding means comprising a guide for a reed and a folder for a strip of thermoplastic coated material, constructed and arranged to fold a strip of thermoplastic coated material and to direct a reed into the fold thereof, and a guide for a strip of thermoplastic material disposed to direct a marginal portion of a thermoplastic material between the plies of said folded strip and with an edge thereof substantially in contact with said reed, a main feeding means including a feeding element and a cooperating main presser device for progressively presenting the assembled strip of coated material, reed and thermoplastic strip between said electrodes and to said field for causing bonding together of said folded strip and said thermoplastic strip closely adjacent said reed, and an auxiliary presser device continuously acting on said bonded material on the seam line after it has passed said electrodes and said main presser device to prevent separation of said strips while said bond is in a tacky condition.

3. An electric bonding machine comprising opposed electrodes, electronic means for supplying radio frequency electric current to said electrodes to establish an electric field therebetween, work-guiding means comprising a guide for a reed and a folder for a strip of thermoplastic coated material, constructed and arranged to fold a strip of thermoplastic coated material and to direct a reed into the fold thereof, and a guide for a strip of thermoplastic material disposed to direct a marginal portion of a thermoplastic material between the plies of said folded strip and with an edge thereof in contact with said reed, a main feeding means including a feeding element and a cooperating main presser device for progressively presenting the assembled strip of coated material, reed and thermoplastic strip between said electrodes and to said field for causing bonding together of said folded strip and said thermoplastic strip closely adjacent said reed, an auxiliary presser device continuously acting on said bonded material on the seam line after it has passed said electrodes and said main presser device to prevent separation of said strips while said bond is in a tacky condition, and an auxiliary feeding means cooperating with said main feeding means to advance the bonded material.

4. An electric bonding machine comprising opposed electrodes one of which has a relatively narrow bonding portion, electronic means for supplying radio frequency electric current to said electrodes to establish an electric field therebetween, a main feeding means including a feeding element and a cooperating main presser device for progressively advancing plies of thermoplastic bondable material between said electrodes and through said field to cause said plies to be bonded together along a relatively narrow path, an auxiliary feeding means cooperating with said main feeding means to advance the bonded material, and an auxiliary presser device comprising a relatively narrow member continuously contacting one face of said bonded material between said main and auxiliary feeding means and in line with said bonded path to hold portions of said plies in pressure contact with each other after they have passed said electrodes.

5. An electric bonding machine as set forth in claim 4 in which the auxiliary presser device is arranged above the plane of the bonded material and is provided with a heel portion, and in which the auxiliary feeding means draws the bonded material at an inclination into contact with said auxiliary presser device and around said heel portion.

6. An electric bonding machine comprising opposed electrodes, electronic means for supplying radio frequency electric current to said electrodes to establish an electric field therebetween, a main feeding means including a feeding element and a cooperating main presser device for progressively presenting plies of thermoplastic bondable material between said electrodes and to said field to cause said plies to be bonded together along a relatively narrow path, an auxiliary feeding means cooperating with said main feeding means to advance the bonded material, an auxiliary presser device comprising a relatively narrow foot having a heel portion overlying said bonded material in continuous contact therewith and rearwardly of said electrodes and in line with said path, and means engaging said bonded material between said main and auxiliary feeding means to lift the material upwardly and into pressure contact with said heel portion.

7. An electric bonding machine as set forth in claim 6 in which the means for lifting the bonded material into pressure contact with the heel portion of the auxiliary pressure device comprises a guide roller located above the level of said heel portion and over which the material is passed by the action of said auxiliary feeding means.

8. An electric bonding machine comprising opposed upper and lower electrodes, the former of which has a work-guiding channel and a relatively narrow bonding portion at one side of said channel, electronic means for supplying radio frequency electric current to said electrodes to establish an electric field therebetween, a main feeding means including a feeding element and a cooperating main presser device for progressively advancing plies of thermoplastic bondable material between said electrodes and through said field to cause said plies to be bonded together along a relatively narrow path, an auxiliary presser device comprising a relatively narrow foot continuously contacting the upper face of said bonded material rearwardly of said electrodes and in line with said bonded path to hold portions of said plies in pressure contact with each other after they have passed the electrodes, a guide-block carried by said auxiliary presser device and having a work-guiding channel in line with the channel in the upper electrode, and a horizontally disposed work-engaging pin carried by the auxiliary presser device.

ORLAND B. REID.

REFERENCES CITED

The following references are of record in the file of this patent:

UNITED STATES PATENTS

| Number | Name | Date |
| --- | --- | --- |
| 2,107,249 | Hepke | Feb. 1, 1938 |
| 2,227,497 | Hallman | Jan. 7, 1941 |
| 2,387,631 | Weir | Oct. 23, 1945 |
| 2,401,991 | Walton | June 11, 1946 |
| 2,446,623 | Welch | Aug. 10, 1948 |

OTHER REFERENCES

Hoyler—An Electronic "Sewing Machine"—Reprint from the August issue of Electronics 1943 (7 pages).